Figure 1:
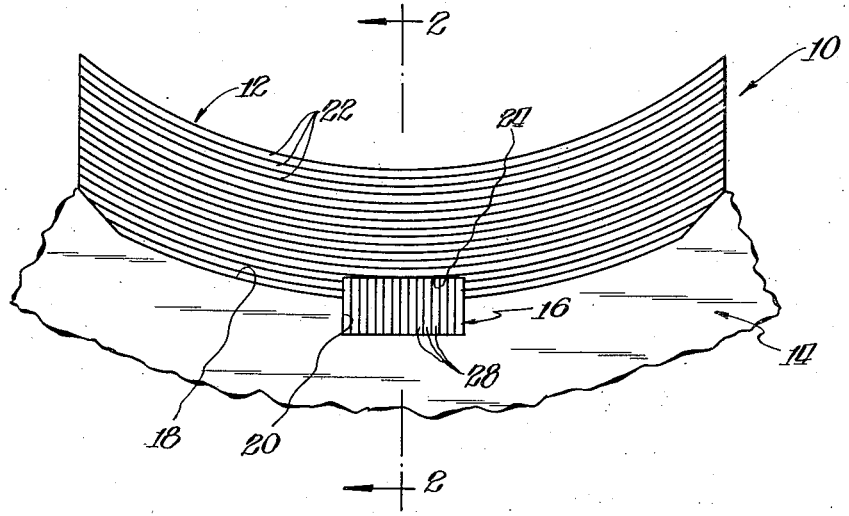

April 4, 1950      J. G. COOK      2,503,028

BEARING

Filed May 19, 1948

Inventor:
John G. Cook.
By: Wallace and Cannon
Atty's.

Patented Apr. 4, 1950

2,503,028

UNITED STATES PATENT OFFICE 2,503,028

BEARING

John G. Cook, Detroit, Mich., assignor to American Brake Shoe Company, New York, N. Y., a corporation of Delaware Application May 19, 1948, Serial No. 28,027

4 Claims. (Cl. 308—8)

This invention relates to bearings and more particularly to bearings of the type employing a laminated bearing liner mounted in a bearing body.

In the manufacture of bearings having a separate bearing liner mounted in the body of the bearing, the problem of securing the liner and the body member from slipping relative to each other arises. This problem is particularly present in bearings wherein the bearing liner and the member interlocking the liner to the body of the bearing are of laminated construction, because of the tendency, in improperly constructed bearings of this type, of the laminations to be separated by the stresses placed thereon during the operation of the device in which the bearing is used.

It is a principal object of my invention to enable a bearing, wherein the liner and the member interconnecting the liner to the body member are of laminated construction, to be constructed in a novel manner whereby relatively great strength is imparted to the bearing and particularly to the interconnection of the bearing liner to the body member of the bearing.

Another object of my invention is to enable a bearing having a laminated bearing liner keyed to a relatively solid body member to be constructed in a novel and expeditious manner whereby the key, securing the bearing liner and body member together, may be of a laminated construction and disposed in interlocking relation between the bearing liner and body member in a manner to afford a bearing of relatively great strength.

A further object of my invention is to enable a bearing of the aforementioned type to be constructed wherein the bearing liner and key may each comprise a plurality of superimposed layers of textile fabric impregnated with and bonded together by a suitable bonding material.

Other and further objects of the present invention will be apparent from the following description and claims and are illustrated in the accompanying drawing which, by way of illustration, shows a preferred embodiment and the principle thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claims.

Figure 2:
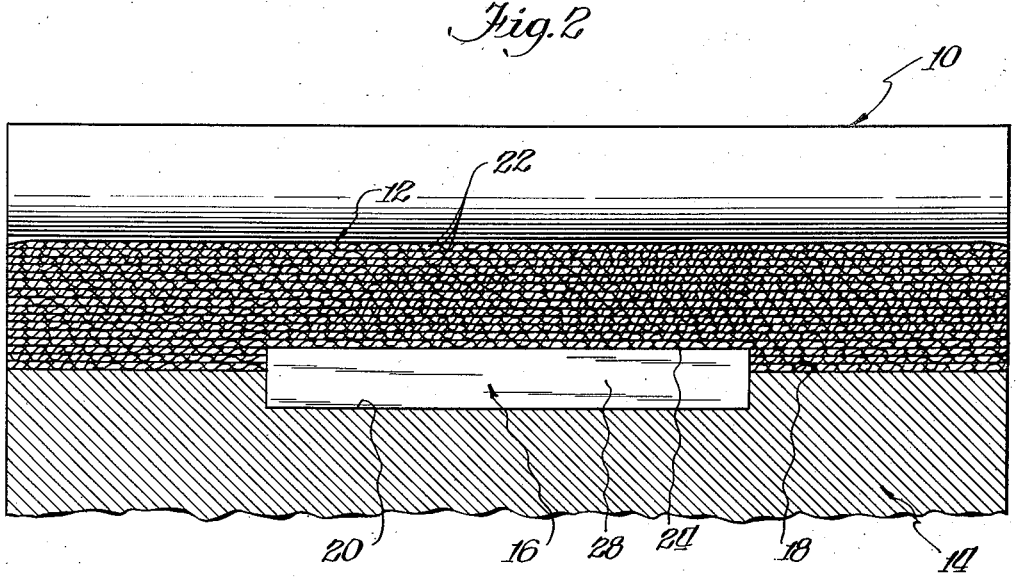

In the drawings:

Fig. 1 is a sectional view taken through a bearing embodying the principle of my invention; and Fig. 2 is a sectional view taken substantially along the line 2—2 in Fig. 1.

The bearing 10 shown in the accompanying drawing, illustrates a preferred embodiment of my invention, and comprises a bearing liner 12 mounted on a body member 14 and keyed thereto by a key member 16, as will be discussed in greater detail presently.

The body member 14 of the bearing may be made of any suitable material such as, for example, cast iron, and has a concave or arcuate shaped bearing surface 18 in which is formed a slot or keyway 20.

The bearing liner 12 comprises a plurality of superimposed layers or laminations 22 which may be made of any suitable material such as, for example, canvas or cotton duck, or other textile fabric, impregnated with and bonded together by a suitable bonding agent. For this purpose the canvas or cotton duck, or other textile fabric, may be impregnated with any suitable bonding mateial such as, for example, a suitable heat-reactive phenolic-aldehyde resin, and the various layers of canvas or cotton duck thus impregnated, may be pressed and bonded together and the resin bond cured under suitable conditions, as is well understood in the art. During the molding operation the bearing liner 12 may be shaped to conform to the shape of the bearing surface 18 of the body member 14 and the parts then cut to suitable lengths.

A recess 24, similar to the recess 20 formed in the body member 14, is formed in the bearing liner 12, and, when the bearing liner is disposed in proper position on the body member 14, this recess 24 is disposed in registry with the recess 20.

The key 16, like the bearing liner 12, is of laminated construction and may be formed of the same material and in the same manner as previously described with relation to the bearing liner 12, namely, by impregnating sheets or layers 28 of a suitable textile fabric, such as canvas or cotton duck, with a suitable heat-reactive phenolic-aldehyde resin bonding material and molding and bonding the layers of the thus impregnated fabric together so as to cure and set the resin bond therein.

The key 16 is adapted to hold the bearing liner 12 and the body member 14 from sliding with relation to each other when the bearing 10 is in use. For this purpose, the key 16 is, when the bearing liner 12 and body member 14 are being assembled, mounted in the slots or keyways 20 and 24 in a position such that the laminations of the key 16 are substantially perpendicular to the laminations 22 of the bearing liner 12. By this construction, it will be seen that the interlocking of the bearing liner 12 and body member 14 is rendered relatively strong, the laminations of the key 16 being disposed perpendicular to the laminations of the bearing liner 12 and to the principal shearing forces exerted between the bearing liner 12 and the body member 14 during operation of the machine, or the like, in which the bearing 10 may be used.

From the foregoing it will be seen that I have provided a novel laminated bearing having relatively great strength and which may be readily and economically produced commercially.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. A bearing comprising a main bearing body member including an arcuate-shaped face having an opening formed therein, a bearing liner mounted on the arcuate-shaped face of said body member and comprised of a plurality of laminations disposed in parallel relation to the face of said main bearing body member, said bearing liner having an opening formed therein complementary to said opening in said body member and being disposed in juxtaposition thereto, and a laminated key member mounted in said openings for holding said bearing liner and said body member against movement relative to each other, the laminations in said key member projecting from said opening in said body member into said opening in said bearing liner in a direction perpendicular to the laminations in said bearing liner.

2. A bearing comprising a body member having a recess formed therein, a bearing liner mounted on said body member and having a recess formed therein disposed in registry with the said recess in said body member, said bearing liner being comprised of a plurality of superimposed parallel laminations bonded together and shaped so that each of said laminations in said liner has an arcuate-shaped cross sectional form in one direction and a flat cross sectional form in a direction perpendicular to said one direction, and a key for holding said body member and said liner against transverse movement relative to each other, said key being comprised of a plurality of laminations bonded together in parallel relation to each other, and said key being mounted in said recesses with said laminations in said key disposed transversely to said laminations in said liner.

3. A bearing comprising a metallic body member having a concave bearing surface, a bearing liner mounted on and shaped to conform to the said concave bearing surface of the said bearing body and comprising a plurality of superimposed layers of textile fabric impregnated with and bonded together by the heat reaction product of a thermosetting phenolic-aldehyde resin, said bearing body member having a recess formed in its concave bearing surface, said bearing liner having a recess formed therein disposed in registry with the said recess in the said bearing surface of said bearing body member, and a key member arranged in the said recesses and comprising a plurality of layers of textile fabric impregnated with and bonded together by the heat reaction product of a thermosetting phenolic-aldehyde resin, the said layers in the said key member being disposed in parallel relationship to each other and being disposed transversely to the planes in which the said layers of laminated textile fabric in the said bearing liner are arranged.

4. A bearing comprising a metallic body member having a concave bearing surface, a bearing liner mounted on and shaped to conform to the said concave bearing surface of said metallic body member and comprising a plurality of superimposed layers of textile fabric impregnated with and bonded together by the heat reaction product of a thermosetting phenol-formaldehyde resin, said body member having a recess formed in its concave bearing surface and said bearing liner having a recess formed therein disposed in registry with the said recess in the said bearing surface of said body member, and a key member arranged in said recesses and comprising a plurality of layers of textile fabric impregnated with and bonded together by the heat reaction product of a thermosetting phenol-formaldehyde resin, the said layers in the said key member being disposed perpendicularly to the layers in the said bearing liner.

JOHN G. COOK.

REFERENCES CITED

The following references are of record in the file of this patent:

UNITED STATES PATENTS

| Number | Name | Date |
| --- | --- | --- |
| 1,366,132 | Pitkin | Jan. 18, 1921 |
| 2,393,017 | Boyd | Jan. 15, 1946 |